United States Patent [19]
Esbensen

[11] Patent Number: 5,796,942
[45] Date of Patent: Aug. 18, 1998

[54] METHOD AND APPARATUS FOR AUTOMATED NETWORK-WIDE SURVEILLANCE AND SECURITY BREACH INTERVENTION

[75] Inventor: Daniel Esbensen, Kihei, Hi.

[73] Assignee: Computer Associates International, Inc., Islandia, N.Y.

[21] Appl. No.: 749,352

[22] Filed: Nov. 21, 1996

[51] Int. Cl.$^6$ .............................. G06F 11/00; G06F 13/00
[52] U.S. Cl. ................................. 395/187.01; 395/200.59
[58] Field of Search ............................ 395/187.01, 186, 395/200.57, 200.58, 200.59; 364/286.4

[56] References Cited

U.S. PATENT DOCUMENTS

| | | | |
|---|---|---|---|
| 5,032,979 | 7/1991 | Hecht et al. | 395/187.01 |
| 5,101,402 | 3/1992 | Chiu et al. | 370/17 |
| 5,414,833 | 5/1995 | Hershey et al. | 395/187.01 |
| 5,488,715 | 1/1996 | Wainwright | 395/182.02 |
| 5,524,238 | 6/1996 | Miller et al. | 395/600 |
| 5,557,742 | 9/1996 | Smaha et al. | 395/186 |
| 5,606,668 | 2/1997 | Shwed | 395/187.01 |
| 5,621,889 | 4/1997 | Lermuzeaux et al. | 395/186 |
| 5,699,513 | 12/1997 | Feigen et al. | 395/187.01 |

OTHER PUBLICATIONS

Winkler, "A Unix Prototype for Intrusion and Anomaly Detection in Secure Networks", NESC Conference, pp. 1–10, Oct. 1990.

Sebring et al., "Expert System in Intrusion Detection : A Case Study", pp. 74–81.

Debar et al., "A Neural Network Component for an Intrusion Detection System", IEEE, pp. 240–250, 1992.

Dowell et al., "The Computer Watch Data Reduction Tool", pp. 99–108.

Snapp et al., "DIDS(Distributed Intrusion Detection System)–Motivation, Architecture, and Early Prototype", pp. 167–176.

Tener, "Discovery: An Expert System in the Commercial Data Security Environment", pp. 45–53, Computer Security Journal vol. 6, No. 1, Dec. 1986.

Avritzer et al., "Reliability Testing of Rule–Based Systems", IEEE, pp. 1–7, Sep. 1996.

Snapp, "Signature Analysis and Communication Issues in a Distributed Intrusion Detection System", Master Thesis–UCA, pp. 1–40, 1991.

*Primary Examiner*—Robert W. Beausoliel, Jr.
*Assistant Examiner*—Scott T. Baderman
*Attorney, Agent, or Firm*—Thomas E. O'Connor, Jr.

[57] ABSTRACT

A network surveillance system includes a handler process (10) for capturing network packets and filtering invalid packets, a first and second continuously sorted record file (15a, 15b), and a scanner process (30) for scanning all sessions occurring on the network and checking for the presence of certain rules (38). When a rule is met, indicating a security incident, a variety of appropriate actions may be taken, including notifying a network security officer via electronic or other mail or recording or terminating a network session. The surveillance system operates completely independently of any other network traffic and the network file server and therefore has no impact on network performance. According to a further embodiment, the invention may include remote surveillance agents (100a–c) for gathering network packets at a remote location and transferring them to a server (110) for analysis by a network surveillance system.

20 Claims, 5 Drawing Sheets

Microfiche Appendix Included
(2 Microfiche, 64 Pages)

METHOD AND APPARATUS FOR AUTOMATED NETWORK-WIDE SURVEILLANCE AND SECURITY BREACH INTERVENTION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDIX

A microfiche appendix including 64 frames on two fiche is included herewith.

BACKGROUND OF THE INVENTION

This invention relates to transmission of information between multiple digital devices on a network and between multiple networks on an internetwork. More particularly, this invention relates to a method and apparatus for ensuring secure network communications by conducting surveillance and checking of all or nearly all data transmitted on a network, by network session reconstruction, and by security breach intervention.

Networking Devices Standards

This specification presumes some familiarity with the general concepts, protocols, and devices currently used in LAN networking applications and in WAN internetworking applications. As these standards are widely publicly available, they will not be fully discussed here.

Generalized Lan Configuration

FIG. 3 is a generalized diagram of a local area network (LAN) 80 of a type that might be used today in a moderate-sized office or academic environment and as an example for discussion purposes of one type of network in which the present invention may be effectively employed. LANs are arrangements of various hardware and software elements that operate together to allow a number of digital devices to exchange data within the LAN and also may include internet connections to external wide area networks (WANs) such as WANs 82 and 84. Typical modern LANs such as 80 are comprised of one to many LAN intermediate systems (ISs) such as ISs 60–62 that are responsible for data transmission throughout the LAN and a number of end systems (ESs) such as ESs 50a–d, 51a–c, and 52a–g, that represent the end user equipment. The ESs may be familiar end-user data processing equipment such as personal computers, workstations, modems for dial-up connections, and printers and additionally may be digital devices such as digital telephones or real-time video displays. Different types of ESs can operate together on the same LAN. Many different LAN configurations are possible, and the invention is not limited in application to the network shown in FIG. 3.

Security problems in network communications

A problem that has increasingly arisen in LAN and WAN environments is that in most prior art networks packet traffic on the line is fundamentally insecure. LANs are often designed to provide easy and flexible access to network-wide resources to any user process connected to the LAN, including processes connected through internet or dial-up connection. Within a corporate LAN, many users may have access to computer files containing data, such as account balances or financial transaction information, that may be manipulated in order to commit or cover-up crime. Firewalls are one technology to prevent unauthorized access from outside a LAN to files on the LAN. But the vast majority of computer crime is perpetrated by authorized, inside users of the LAN, accessing or manipulating data in ways that are not authorized. Firewalls offer no protection against unauthorized insider access to LAN resources.

Other security issues involve spoofing and sniffing. In a LAN segment such as 72d, for example, every ES on the LAN segment will hear every packet sent to any ES on that segment. In general, each ES in the network has a unique ethernet (or MAC) address, and an ES will discard any packets it hears that are not addressed to its MAC address. However, ESs are not forced by the network to discard packets not addressed to them and may operate in a promiscuous mode in which the ES reads every packet it hears on the network and passes that packet up to higher layer software running in the ES. While promiscuous mode has legitimate uses during adaptor configuration or debugging, it can also be used by an ES to read and examine all the network traffic on the network without authorization. This activity is sometimes known in the art as sniffing.

A problem related to sniffing can happen during transmissions from a LAN whereby software running on the LAN can send the outgoing packet addresses to mimic another ES's packets. This technique is known in the art as spoofing. An unscrupulous user spoofing another's packets can introduce unwanted data, such as viruses, into a packet stream being transmitted from the ES, or can hijack a user's network session and gain unauthorized access to other system resources.

A number of techniques have been proposed or implemented to enhance network security. In general, all of these techniques rely on verification of either a MAC address, and IP address, or a user identification. These techniques are limited, however, because there is no guarantee that packets being transmitted on the network have a valid MAC or IP address in their packet header and there is also no guarantee that an authorized user of a LAN will not access or manipulate LAN data in an unauthorized way.

What is needed is a simple, inexpensive, system for monitoring the activity on a network and scanning for unauthorized network activity and automatically taking action when unauthorized activity is detected. Ideally, such a technique should be implementable on a network without decreasing network performance.

For purposes of clarity, the present discussion refers to network devices and concepts in terms of specific examples. However, the method and apparatus of the present invention may operate with a wide variety of types of network devices including networks dramatically different from the specific examples illustrated in FIG. 3 and described below. It is therefore not intended that the invention be limited except as done so in the attached claims.

In many existing LAN systems, data on the network is grouped into discrete units referred to as packets, each having an indication of source and destination. While the present invention is not limited to packetized data, data is described herein in terms of packets in order to ease understanding.

SUMMARY OF THE INVENTION

The invention is an improved method and apparatus for transmitting data in a LAN. According to the present invention, a Network Security Agent™ surveillance system, is able to read all packets transmitted on a network segment, reconstruct all user sessions, and scan all user sessions for noteworthy or suspicious activity, all in real-time and without any significant impact on network performance. When any noteworthy or suspicious activity is detected, alerts are generated and appropriate intervention actions can be taken.

The present invention makes use of Packet Sniffing, Session Reconstruction, and Session Scanning in order to scan sessions for unauthorized activity and, when unauthorized activity is detected, predetermined automatic intervention action is taken. The present invention uses automatic real-time session reconstruction and scanning to accomplish network surveillance on the tens of millions of packets generated on a typical LAN each day.

In accordance with the present invention, hardware and software elements are optimally designed to be able to read all packets on the LAN in real-time and reconstruct sessions. Customized routines for reading low-level packets directly from the ethernet controller are incorporated in the invention in order to capture 100% of all network traffic.

In one embodiment, the invention includes software elements written in a language optimized for data handling and I/O. The invention includes a set of user interfaces to allow a network administrator to review data gathered by the invention and to set certain parameters.

The invention will be better understood with reference to the following drawings and detailed description.

DESCRIPTION OF THE PREFERRED EMBODIMENT

Overview

Figure 1:
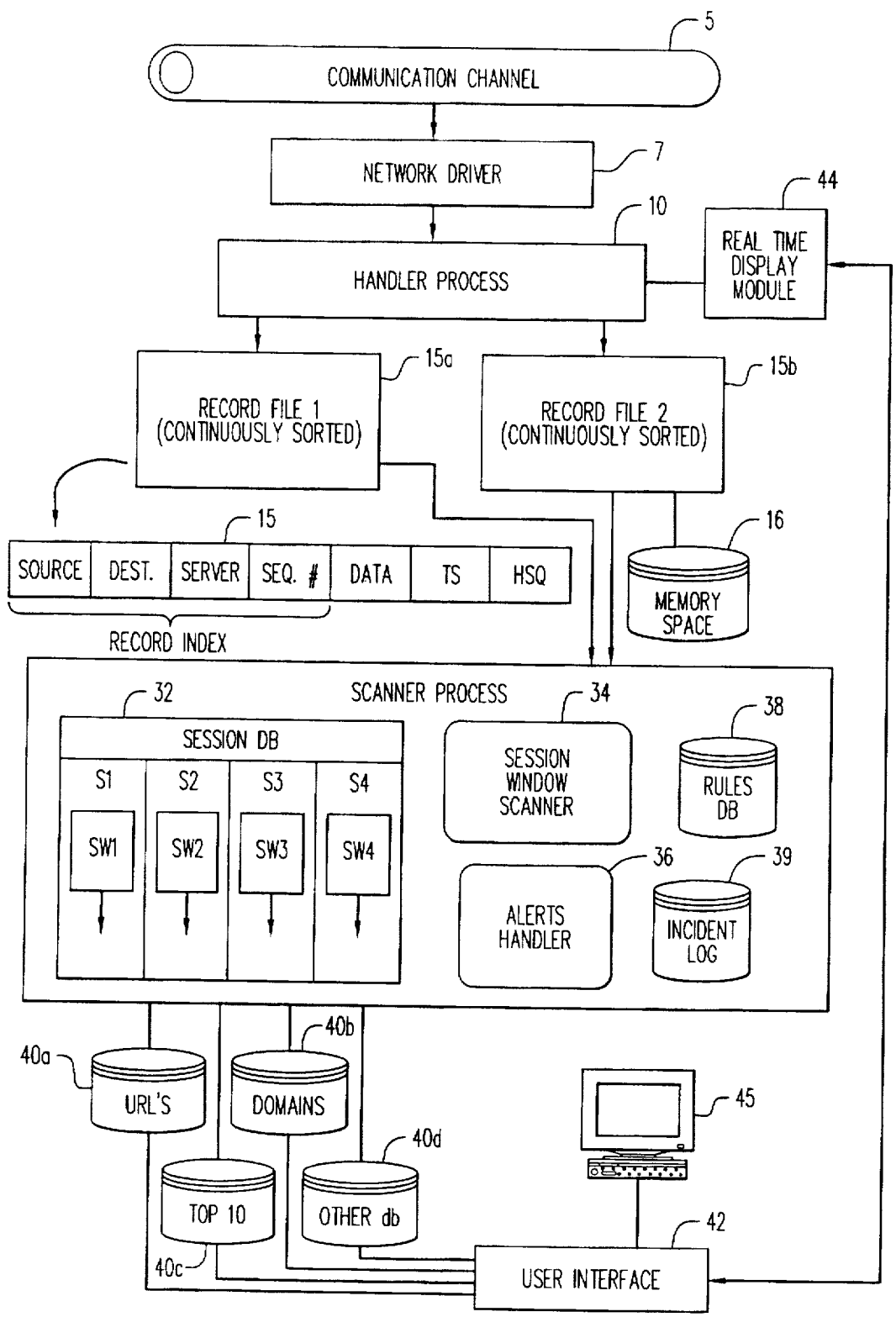
FIG. 1 is a block diagram of a network surveillance system according to the present invention.

FIG. 1 is a block diagram of a network surveillance system in accordance with one embodiment of the present invention. Shown in FIG. 1 is a communication channel 5 which indicates a connection to a LAN or other data communication medium. Data, either packetized or otherwise, is received from channel 5 by a network driver 7 which may include hardware and software components for quickly reading the signals on channel 5 and translating them into computer readable data. Network driver 7 may be a preexisting or custom network interface and is set to be in promiscuous mode in which it receives all or nearly all data transmitted on channel 5. Data received on network driver 7 are passed to handler process 10, which may preform some filtering or processing of the data as described below, before placing the data as records into one of files 15a or 15b as described below. Files 15a and 15b are continuously sorted as is known in the art. Scanner process 30 reads records from files 15a-b and organizes the records into a session database 32. Session data base 32 contains a sequential listing of all packets received in a particular session. According to the invention, scanner process 30 includes a session window (SW) scanner 34. SW scanner 34 defines session windows for reading windows of data in session data base 32 and testing a set of rules 38 against those windows of data.

According to the invention, session windows are constructed so as to provide an overlapping and sliding window of data so that rules may be fully tested even if the data that would fire the rule is split on packet reception between record file 1 and record file 2. Data bases 40a–d are maintained to provide information regarding network usage parameters such as accessed URLs, accessed domains, the top ten URLs accessed, etc. A user interface 42 is designed to accept user instructions from a work station such as 45 and to display requested data to the work station 45 as described below. An optional real time display engine 44 may interact with handler process 10 to display real-time session data.

According to the invention, newly transmitted packets on channel 5 are captured even while previously captured packets are being scanned by incorporating two record files 15a and 15b which operate such that while a record file is being scanned and analyzed for surveillance incidents, the other record file is being filled with continuously sorted packets by handler process 10. Associated with the record files also may be a memory space 16 for storing larger amounts of packet data.

Handler Process

Figure 2:
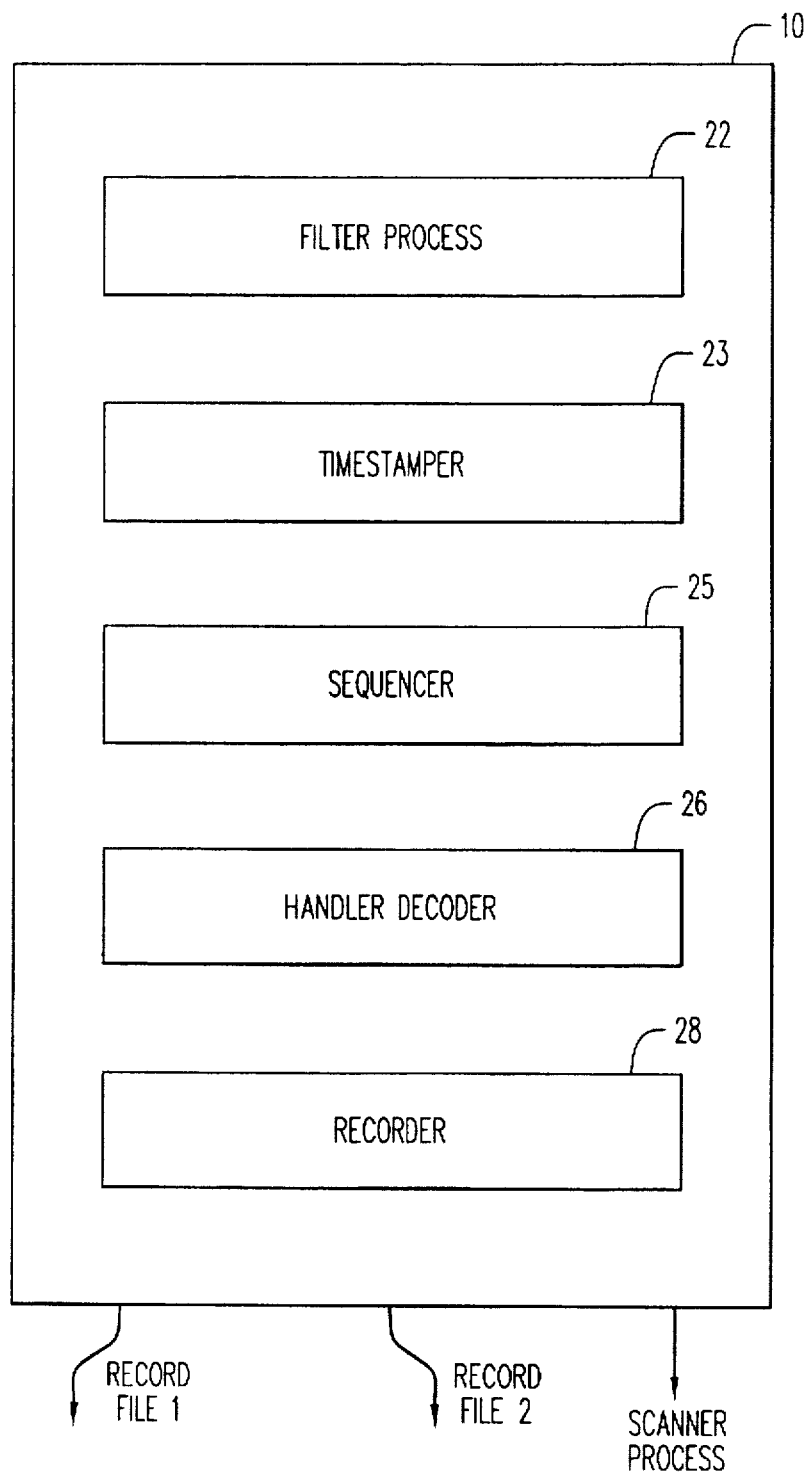
FIG. 2 is a block diagram of a handler process in accordance with an embodiment of the invention.

FIG. 2 illustrates the functions of handler process 10 according to one embodiment of the invention. Handler 10 reads all or a large subset of data on channel 5 and selects session packets for later reconstruction. Handler 10 communicates with scanner 30 and real time display engine 44.

Handler 10 prioritizes reading packets from channel 5, which on a busy LAN can be in excess of 50,000,000 packets a day. One embodiment of the handler uses a small state-table and is completely event driven. Reading data from network 5 packets takes the highest priority so that no desired packets are missed.

Handler process 10 includes a filtering process 22 for initial packet filtering. Filtering process 22 can be set, according to the invention, to filter out packets based on a number of criteria including filtering out invalid packets due to a bad check sum or certain identifications.

Handler process 10 also includes a timestamper 23 for adding a time stamp to each network packet received and a sequencer 25 for adding a sequence number to each packet received in order to uniquely identify each packet. Handler decoder 26 partially decodes network packets and can be programmed to handle certain internal packet compression.

Recorder 28 writes each processed data packet out as a record into a continuously sorted record files 15a–15b. Which file is written to is determined scanner process 30, as described below. A representative record 18 is shown in FIG. 1 having a number of fields including indications for a source, a destination or group of destinations, a server, a sequence number, data, a timestamp (T.S.), and a handle sequence number (HSQ).

Scanner Process

Scanner 30's primary task is session reconstruction and session scanning. At timed intervals, scanner 30 sets a flag requesting a group of packets for session reconstruction. The packets are generally provided by handler 10 from either file 15a or 15b and handler 10 begins storing newly received records in the file not being accessed by scanner 30. When scanner 30 receives the packets, it immediately proceeds to reconstruct sessions.

Sessions are reconstructed based on any combination of source and destination indications such as IP address and port (for TCP/IP) or Local Area Transport (LAT) virtual circuit and slot. Each identified session is reconstructed separately along with a session identifier. Some portion of previously reconstructed session data is maintained to allow SW scanner 34 to detect patterns that may cross record files.

Rules and Intervention Actions

The reconstructed session is passed through a series of user-defined rules 38. In one embodiment, each rule consists of simply an alert name and a pattern. When SW scanner 34 detects that a session window contains the pattern, the alert is triggered.

Associated with each alert name is a description of the alert, a list of actions to be taken when the alert is triggered, and the priority level of the alert. When the alert is triggered, an incident is logged in log 39. Incident log 39 contains identifying data of the incident such as the name of the alert, description, user login name, location (TCP/IP or LAT address/port), and a snapshot of the session-with an arrow pointing to the pattern that caused the alert to be triggered.

After logging the incident, any alert actions are taken by alert handler 36. Possible alert actions include sending email to someone or group of people containing for example the name of the triggered alert, location (TCP/IP or LAT address/port), user login name, and a snapshot of the session with an indication of the pattern that caused the alert to be triggered.

Another possible alert action includes recording the session from the alert moment forward for playback later on. The recording contains, keystroke-for-keystroke, everything that the user does that involves transmission over the network. An alert may also take action to terminate the user connection that generated it.

Scanner 30 also may handle session data base cleanup procedures—such as purging inactive login information.

Real Time Display Module

Real time display module 44 is an optional component of the invention that is in charge of displaying sessions in real-time. When real time display module 44 receives a watch message from either alert handler 36 or user interface module 42, it creates a terminal-emulation pop-up window. Each window displays a user session in real time keystroke by keystroke. In this situation, both scanner 30 and real time display module 44 will receive certain packets from handler 10. Real time display module 44 then sends a message to handler 10, requesting that packets from the watched session be duplicated and sent to real time display module 44. When watch packets are received, they are formatted and sent to the appropriate terminal-emulation pop-up window.

If the session is disconnected, a session closed message is displayed in the pop-up window and watching of the session is halted. If the user manually closes the pop-up window, session watching is also discontinued for that session.

User Interface Module

User interface module 42 provides a user interface to the network surveillance system. From module 42, sessions can be viewed, reports generated, alerts and rules defined, and session actions taken.

Module 42 communicates with real time display module 44 when session watching is requested. All other displays and actions performed by module 42 are performed through data base operations. Scanner 30 notices data base changes (such as new alerts or rules) and rebuilds its internal tables as needed.

Module 42 can be operated either with a mouse, directly from the keyboard, or by any other method for interfacing between a computer work station and a user. Extensive on-line help is provided at all decision points.

EXAMPLE

The operation of the invention may be further understood by an example. For the purposes of this example, assume that LAN 80 is a local area network in an investment management firm. The network may include a number of functions which a particular employee is authorized to use at any time from any location, including from a dial-up connection. One such function that an employee may access at any time is interoffice email functions. In addition, the LAN may include data of a sensitive nature pertaining to customer accounts, which normally would only be accessed by authorized employees during business hours while on-site at the office handling customer accounts. Standard prior art security measures, such as file access authorization, might designate certain employees to have access to this data, but would usually not limit that access based on whether the employee was connecting via a dial-up connection or whether the employee was attempting to access the data during valid business hours.

According to the current invention, a rule could be set up to monitor access to any file within the customer file structure. This rule could be a very simple rule that checked for a certain text string being passed from a client process to a server process over the network where that text string represented a file path name. To further illustrate aspects of the invention, assume that the complete file path name is divided into more than one network packet and that the two network packets are received just as scanner 30 requests a switch from record file 1 to record file 2.

Such a rule may be represented as:

| IF | text_contains("÷ata¢ustomer") AND (time()=off_hours OR connection()=dial_up) |
|---|---|
| THEN | email(session_data, supervisor) terminate_session () |
| ENDIF | |

According to this example, a first packet from a session S2 ending with the data "\data\cu" is transmitted on channel 5 and placed by handler 10 into record file 15a, before the next packet from S2 is received, scanner 30 signals to handler 10 to switch record files. Scanner 30 then reads the data in record file 1, and places data from S2 in the appropriate session database file. Session window scanner 34 then scans the text in SW2 for the above rule, and since the text is not found, the rule does not fire.

In the meantime, a second packet from session S2 beginning with the data "stomer"is transmitted on channel 5 and placed by handler 10 into record file 15b. When scanner 30 has fully analyzed the data from 15a, it switches to 15b and places the additional data from S2 in the appropriate session database file. Session window scanner 34 then scans the text in SW2 for the above rule, and, because SW2 includes an overlap of at least 13 bytes, the rule fires. The incident is logged in 39 and the alert is handled by handler 36.

Specific Implementation

A primary challenge of the present invention is to be able to read all data packets on the LAN in real-time. In one specific installation, an OpenVMS operating system, running on a Digital Alpha/AXP CPU at speeds of 233 Mhz to 500 Mhz was chosen to keep up with the heavy processing demands of reading 100% of a busy LAN's packets while handling session reconstruction, real-time scanning, and real-time display tasks.

Customized routines for reading low-level packets directly from a network controller were written in C using the OpenVMS' asynchronous QIO services. The real-time display module was also written in C.

For session reconstruction and real-time session scanning, one embodiment was implemented using the INTOUCH 4GL(TM) programming language, developed by the assignee of the present invention. INTOUCH 4GL is a high performance language designed specifically for data manipulation and text scanning. For use by the surveillance agent INTOUCH 4GL was enhanced by including specialized functions for high-speed pattern matching.

INTOUCH 4GL was also used for the user interface and incident tracking, reporting, data base maintenance, and recorded session playback.

Remote Surveillance Agent

Figure 4:
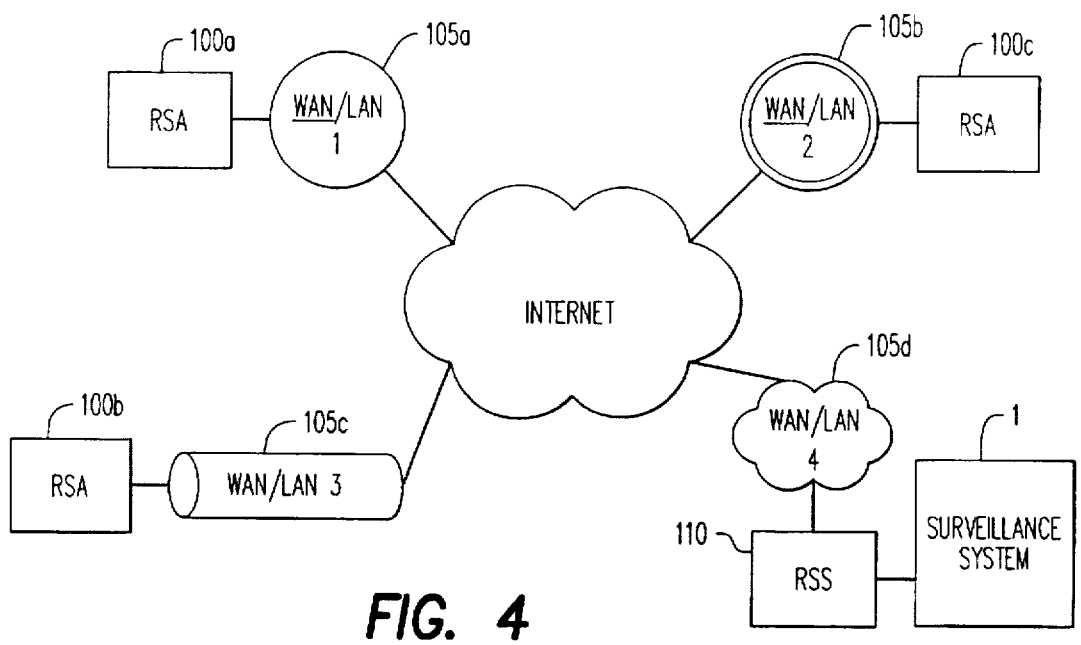
FIG. 4 illustrates a number of remote networks with remote surveillance system agents according to an embodiment of the invention.
Figure 5:
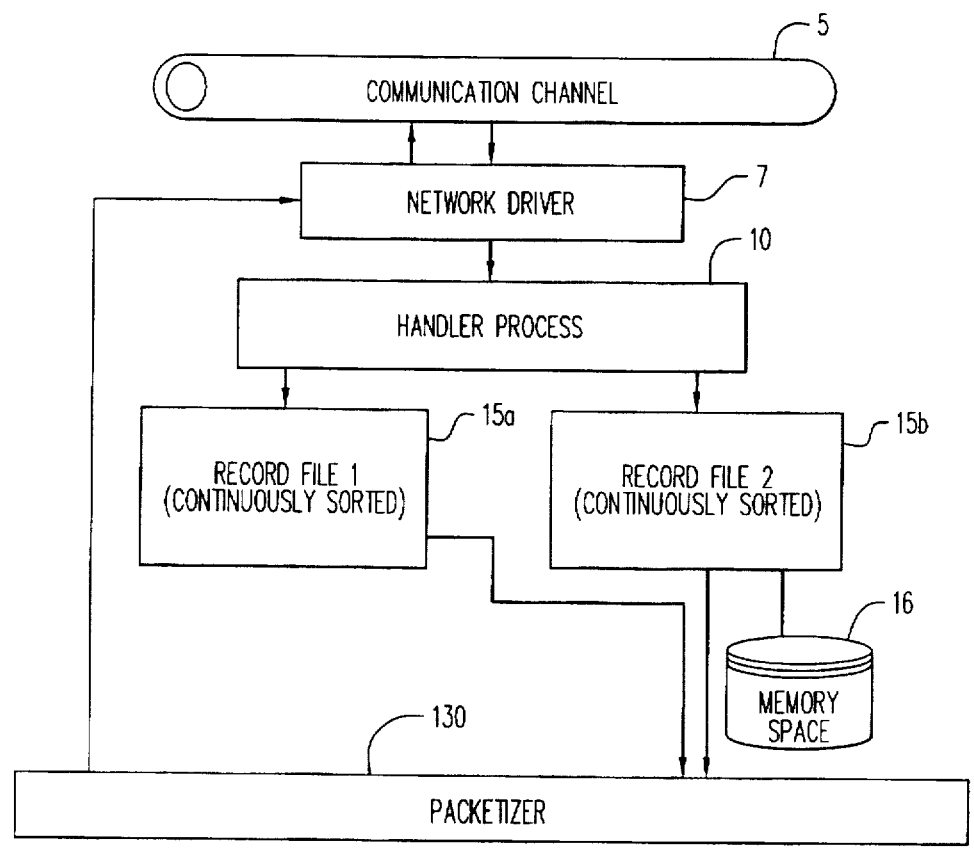
FIG. 5 illustrates a remote surveillance system agent according to an embodiment of the invention.

FIGS. 4 and 5 illustrate a different embodiment of the invention wherein a number of remote surveillance agents (RSAs) may be utilized along with an internet in order to capture network data traffic on one site and have that traffic analyzed and sessions reconstructed at another site. FIG. 4 shows RSAs 100a-c connected to different WAN/LAN networks 105a. According to this embodiment, RSAs 100a-c collect all network data traffic from the LAN or WAN to which they are attached, but instead of fully scanning that traffic, RSAs 100a-c store collected packets into a form that may be transmitted to remote surveillance server (RSS) 110. RSS 110 receives the information for RSAs 100a-c and presents this information to a surveillance system 1 according to the invention, which performs session reconstruction, rule checking, and alert handling as described above.

According to one specific embodiment RSAs 100a-c collect multiple packets on their attached WAN/LAN and compress multiple packets into a single internet packet which may be transmitted back through the WAN/LAN, over the internet, to RSS 110. According to this embodiment, RSAs 100a-c can in this way allow a surveillance system 1 located in one city to monitor several WAN/LANs located in different cities simply by plugging an RSA into the remote network without making any other changes to the network.

FIG. 5 illustrates one example of an RSA according to the invention. LAN/WAN data is received and processed by handler process 10 substantially as described above and stored in one of a plurality of record files 15a–b. Record file data is then read by internet packetized 130, which stores multiple LAN/WAN packets into an internet packet which is then passed to driver 7 for transmission to RSS 110 via the internet. In an alternative embodiment, LAN/WAN packets are received by an RSA and timestamped and immediately transmitted over the internet, either singly or in groups, with minimal additional processing by the RSA.

Figure 3:
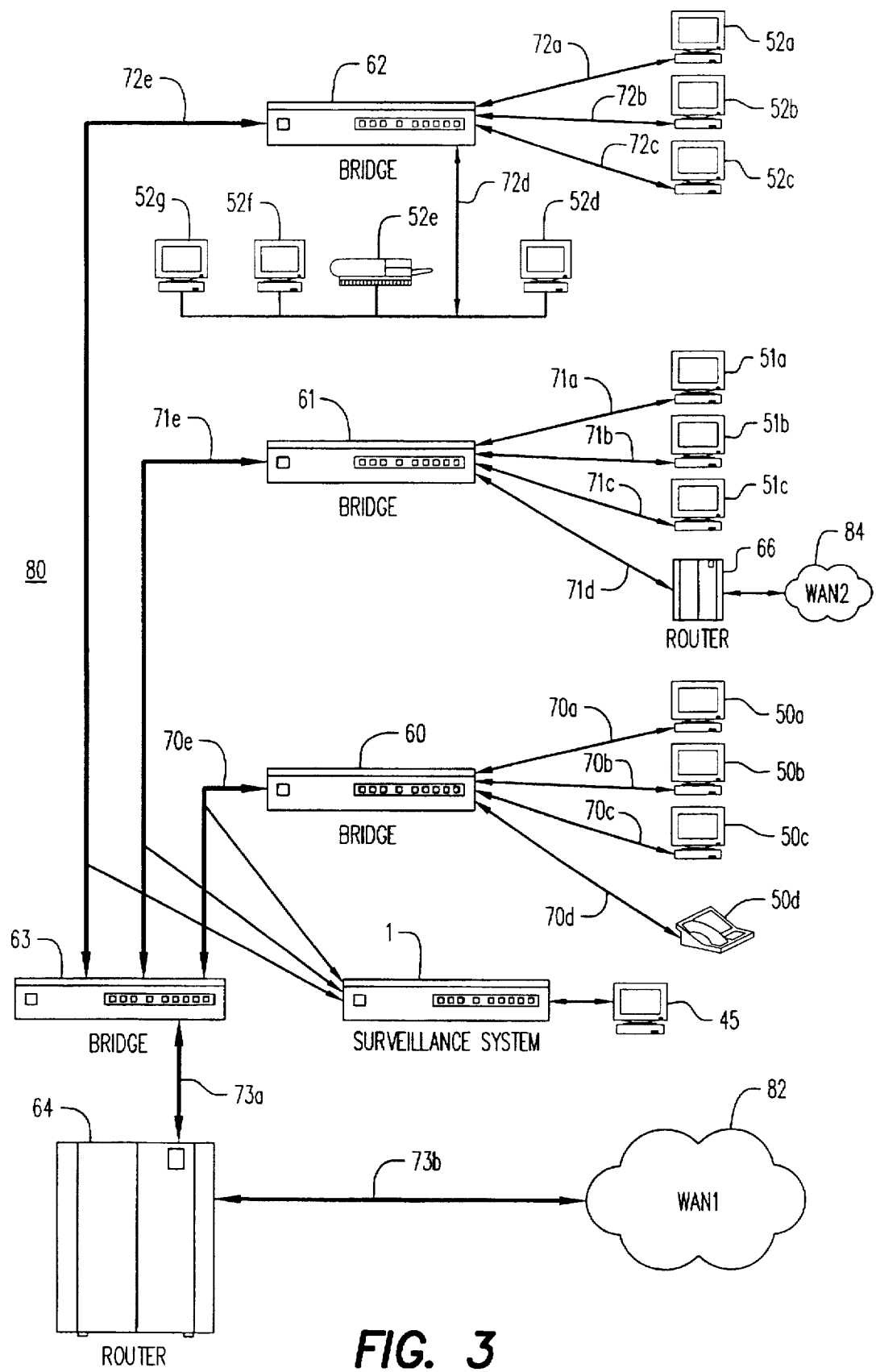
FIG. 3 is a diagram of a generalized LAN in which the present invention may be employed.

The present invention may be embodied in software instructions either recorded on a fixed media or transmitted electronically. In such a case, the surveillance system 1 of FIG. 3 will be a high performance computer system and the software instructions will cause the memory and other storage medium of computer 1 to be configured as shown in FIG. 1 and will cause the processor of computer 1 to operate in accordance with the invention.

Figure 6:
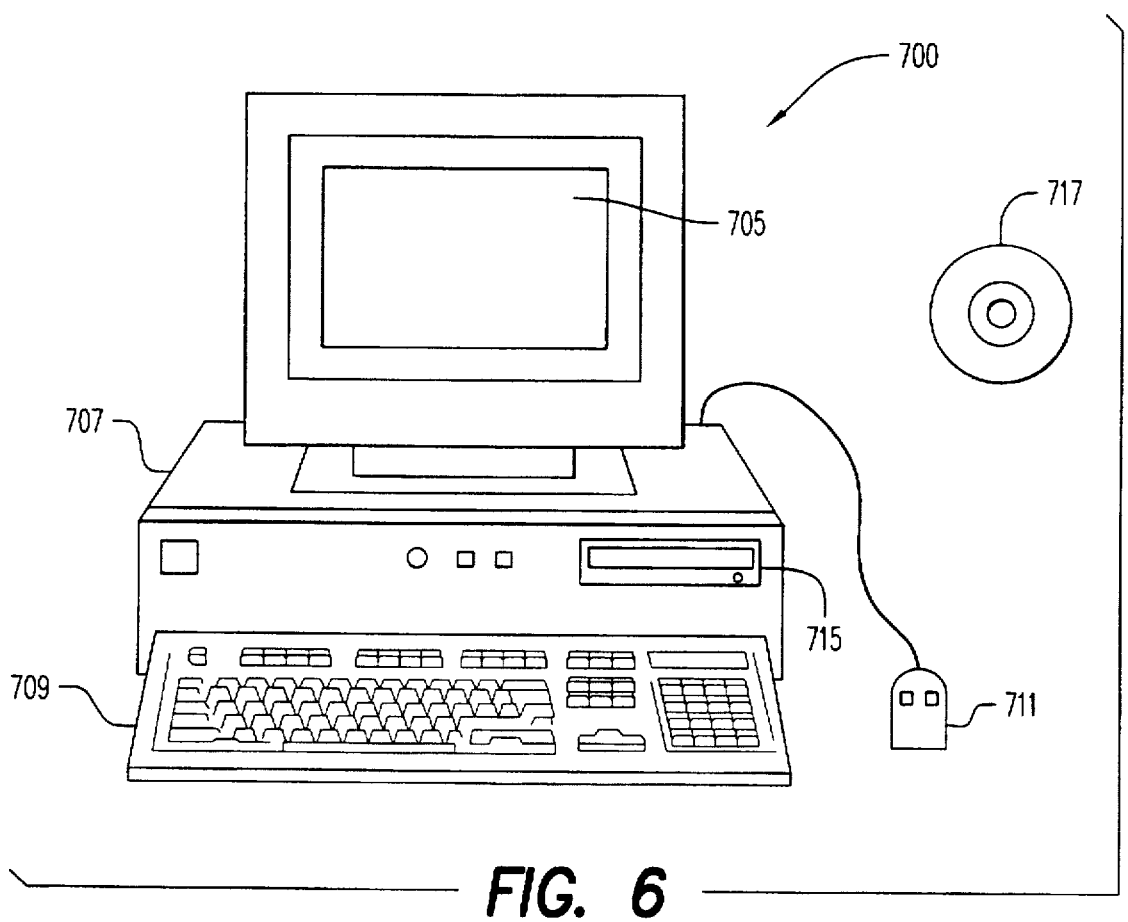
FIG. 6 is a block diagram of a computer system which may be configured with a software embodiment in accordance with the invention.

FIG. 6 illustrates an example of a computer system used to execute the software of the present invention. FIG. 7 shows a computer system 700 which includes a monitor 705, cabinet 707, keyboard 709, and mouse 711. Cabinet 707 houses a disk drive 715 for reading a CD-ROM or other type disk 717 and houses other familiar computer components (not shown) such as a processor, memory, disk drives, and the like, as well as an adaptor 1 for connection to a communication channel 5.

The invention has now been explained with reference to specific embodiments. Other embodiments will be apparent to those of skill in the art. In particular, specific processing orders have been described and functions have been described as being in particular orders, however, many of these sub functions could be differently arranged without changing the essential operation of the invention. It is therefore not intended that this invention be limited, except as indicated by the appended claims.

What is claimed is:

1. A network surveillance system for conducting surveillance on a network independent of a network server comprises:

a network driver for capturing data on a network, said data not necessarily addressed to said surveillance system;

a handler process for receiving data from said network driver and storing said data in real time;

a plurality of record files for receiving network data and storing said data before further examination;

a scanner process for designating one of said plurality of record files as a receive file while reading data from another of said plurality of record files and for using said data to construct a plurality of session data streams, said session data streams providing a sequential reconstruction of network data traffic organized by session;

a session window scanner for reading a window of data in one of said plurality of session data streams;

a set of surveillance rules defining data patterns which, when met, will trigger a surveillance alert; and an alerts handler for responding to fired rules and taking defined actions.

2. The device according to claim 1 further comprising:

a user interface allowing a user to view sessions in real time and to access a plurality of data bases containing session events maintained by said scanner process.

3. The device according to claim 1 wherein said handler process filters certain network data and adds an indication of the time when certain network data is received from the network.

4. The device according to claim 1 wherein said plurality of record files are continuously sorted according to a record index.

5. The device according to claim 1 wherein said session window includes an overlap portion of previously examined data from said session data base in order to test for rules that would apply to data contained in more than one record.

6. The device according to claim 5 wherein said session window overlap is determined by the longest text string that could trigger a rule.

7. The device according to claim 1 wherein said alerts handler may respond to an alert by transmitting a message to a specified plurality of destinations.

8. The device according to claim 1 wherein said alerts handler may respond to an alert by forcing a user session to terminate.

9. The device according to claim 1 wherein said alerts handler may respond to an alert by recording a session.

10. A fixed computer readeable medium containing computer executable program code, which, when loaded into an appropriately configured computer system will cause the computer to embodiment the device of claim 1.

11. A method for for conducting surveillance on a network comprises:

capturing data on a network;

storing said data in real time in one of a plurality of record files;

using said data to construct a plurality of session data streams, said session data streams providing a sequential reconstruction of network data traffic organized by session;

reading a window of data in one of said plurality of session data streams;

testing said window of data against a set of surveillance rules; and responding to fired rules by taking defined interventions.

12. The method according to claim 11 further comprising presenting a view of reconstructed sessions to a user in real time.

13. The method according to claim 11 further comprising filtering certain network data packets before storing.

14. The method according to claim 11 further comprising continuously sorting record files.

15. The method according to claim 11 further comprising examining an overlap portion of previously examined data in order to test rules that would apply to data contained in more than one record.

16. The method according to claim 15 wherein said session window overlap is determined by the longest text string that could trigger a rule.

17. The method according to claim 11 further comprising responding to an alert by transmitting a message to a specified plurality of destinations.

18. The method according to claim 11 further comprising responding to an alert by forcing a user session to terminate.

19. The method according to claim 11 further comprising responding to an alert by recording a session.

20. A fixed computer readeable medium containing computer executable program code, which, when loaded into an appropriately configured computer system will cause the computer to embodiment the method of claim 11.

* * * * *